US012581586B2

(12) United States Patent
Myers et al.

(10) Patent No.: US 12,581,586 B2
(45) Date of Patent: Mar. 17, 2026

(54) SYSTEMS AND METHODS FOR IGNITING PLASMA WITHIN TUBES

(71) Applicant: Eli Lilly and Company, Indianapolis, IN (US)

(72) Inventors: Andrew Pennington Myers, West Lafayette, IN (US); Lee Edward Organski, West Lafayette, IN (US); Alexey Shashurin, West Lafayette, IN (US); Xingxing Wang, West Lafayette, IN (US)

(73) Assignee: Eli Lilly and Company, Indianapolis, IN (US)

( * ) Notice: Subject to any disclaimer, the term of this patent is extended or adjusted under 35 U.S.C. 154(b) by 131 days.

(21) Appl. No.: 18/557,687

(22) PCT Filed: May 11, 2022

(86) PCT No.: PCT/US2022/028659
§ 371 (c)(1),
(2) Date: Oct. 27, 2023

(87) PCT Pub. No.: WO2022/240919
PCT Pub. Date: Nov. 17, 2022

(65) Prior Publication Data
US 2024/0215143 A1     Jun. 27, 2024

Related U.S. Application Data

(60) Provisional application No. 63/188,615, filed on May 14, 2021.

(51) Int. Cl.
*H05H 1/24*     (2006.01)
*B29C 59/00*     (2006.01)
(Continued)

(52) U.S. Cl.
CPC .......... *H05H 1/246* (2021.05); *B29C 59/005* (2013.01); *B29C 59/142* (2013.01);
(Continued)

(58) Field of Classification Search
None
See application file for complete search history.

(56) References Cited

U.S. PATENT DOCUMENTS 5,514,276 A * 5/1996 Babcock .............. B01D 69/127
                                                        210/490
5,681,611 A    10/1997 Yoshikawa et al.
(Continued)

FOREIGN PATENT DOCUMENTS

EP          0089124 A1     2/1983
EP          0622111 A1     4/1994
(Continued)

OTHER PUBLICATIONS

Fatyeyeva, et al, "Effect of cold plasma treatment on surface properties and gas permeability of of polyimmide films", RSC Advances, Jun. 20, 2014, pp. 31036-31046.
(Continued)

*Primary Examiner* — Wilson Lee
(74) *Attorney, Agent, or Firm* — Arthur Shum

(57)     ABSTRACT

A system is provided for generating plasma within narrow diameter tubes, e.g., tubes with an inner diameter of less than 1 millimeter. The system may comprise the tube, a nozzle connected to at least one end of the tube configured to supply a gas into the interior of the tube at atmospheric pressure, at least one ring-shaped anode electrode and configured to surround an outer surface of the tube, at least one ring-shaped cathode electrode spaced apart from the anode electrode along the longitudinal axis and configured to surround the outer surface of the tube, and a voltage source
(Continued)

connected to the at least one anode electrode. When activated, the system is configured to generate an electric field between the electrodes which ignites a plasma within the gas in the interior of the tube.

17 Claims, 12 Drawing Sheets

(51) Int. Cl.
    *B29C 59/14*       (2006.01)
    *B29K 23/00*       (2006.01)

(52) U.S. Cl.
    CPC ..... *H05H 1/2431* (2021.05); *B29C 2059/145* (2013.01); *B29K 2023/0633* (2013.01); *H05H 2245/42* (2021.05)

(56) References Cited

U.S. PATENT DOCUMENTS

| | | | |
|---|---|---|---|
| 5,693,196 | A | 12/1997 | Stewart et al. |
| 5,830,329 | A | 11/1998 | Stewart et al. |
| 6,465,964 | B1 | 10/2002 | Taguchi et al. |
| 8,202,245 | B2 | 6/2012 | Weber et al. |
| 8,361,334 | B2 | 1/2013 | Garlough |
| 8,524,097 | B2 | 9/2013 | Garlough |
| 9,192,040 | B2 | 11/2015 | Ehlbeck et al. |
| 9,831,068 | B2 | 11/2017 | Milicevic et al. |
| 10,192,722 | B2 | 1/2019 | Okino et al. |
| 10,730,239 | B1 * | 8/2020 | Glukhoy ............... B29C 64/245 |
| 2004/0131513 | A1 | 7/2004 | Lazarovich et al. |
| 2004/0154541 | A1 | 8/2004 | Colpo et al. |
| 2005/0016456 | A1 | 1/2005 | Taguchi et al. |
| 2006/0129215 | A1 | 6/2006 | Helmus et al. |
| 2007/0005024 | A1 | 1/2007 | Weber et al. |
| 2014/0257450 | A1 | 9/2014 | Jung et al. |
| 2015/0231306 | A1 | 8/2015 | Hann |
| 2019/0358708 | A1 * | 11/2019 | Mariotti .................. B22F 1/054 |
| 2020/0068663 | A1 * | 2/2020 | Okamoto .............. C08K 3/041 |
| 2021/0050181 | A1 * | 2/2021 | Hubicka ............. C23C 14/3485 |
| 2021/0333173 | A1 * | 10/2021 | Sandkuijl ........... H01J 49/0004 |
| 2022/0023880 | A1 * | 1/2022 | Tang ......................... F01N 3/30 |

FOREIGN PATENT DOCUMENTS

| | | |
|---|---|---|
| WO | 9520688 A1 | 8/1995 |
| WO | 2020070482 | 4/2020 |

OTHER PUBLICATIONS

Li, et al, "Hydrophobic over-recovery during aging of polyethylene modified by oxygen capacitively coupled radio frequency plasma: A new approach for stable superhydrophobic surface with high water adhesion", Surface & Coatings Technology, 2012, pp. 4952-4958.
Desmet, et al, "Nonthermal Plasma Technology as a Versatile Strategy for Polymeric Biomaterials Surface Modification: A Review", BioMacromolecules, Sep. 2009, pp. 2351-2378.
Buda, et al, "Pulsed Atmospheric-Pressure DBD Plasma Produced in Small-Diameter Tubes", IEEE Transactions on Plasma Science, vol. 43, No. 2, Feb. 2015, psg 572-579.
Tripathy, et al, "Natural and bioinspired nanostructured bactericidal surfaces", Advances in Colloid and Interface Science, 2017, pp. 85-104.
International Search Report of the International Searching Authority Pertaining to International Patent Application No. PCT/US2022/028659; Date of Mailing: Aug. 26, 2022; 6 pages.

* cited by examiner

400

402: Fill interior of tube with at least one gas at atmospheric pressure

404: Pass tube through at least one ring-shaped anode electrode

406: Pass tube through at least one ring-shaped cathode electrode spaced apart from anode electrode 408: Activate voltage source connected to anode electrode(s) to ignite a plasma within the gas within tube

1500

1502

1504

1506

Raw image uploaded for processing. Bright spots identify protrusions.

Image processing used to carefully enhance contrast between protrusions and smooth surface Image is "thresholded" and converted to 8-bit, B&W image.

1508

| Slice | Count | Total Area | Average Size | %Area |
|---|---|---|---|---|
| Plas_40_002.tif | 74 | 0.573 | 0.008 | 1.362 |

$$6.91 * 10^5 \frac{counts}{mm^2}$$

1510

1

SYSTEMS AND METHODS FOR IGNITING PLASMA WITHIN TUBES

FIELD OF THE DISCLOSURE

The present disclosure relates to systems and methods for igniting plasmas within tubes. More particularly, the present disclosure relates to igniting plasmas within the interior of narrow diameter polymer tubes to plasma-etch the interior surface of such tubes, thereby imparting the interior surface with protrusions that increase such interior surface's hydrophilicity.

BACKGROUND OF THE DISCLOSURE

Electric discharge plasmas may be used to treat and impart various properties on surfaces of objects. For example, discharge plasmas may be used to etch surfaces of polymer or metal objects to impart microscopic protrusions that increase a hydrophilicity (or wettability) of such surfaces, alter a roughness or a coefficient of friction of such surfaces, and/or make such surfaces more resistant to microbial growth. Such characteristics are useful in many medical contexts and plasma etching may therefore be desirable to use in the manufacturing of many types of medical device components.

However, known methods of igniting an electric discharge plasma suffer from certain technical challenges that make them unreliable, time-consuming, and/or expensive to use in large-scale manufacturing of medical device components. For example, certain existing systems or methods of igniting an electric discharge plasma are only capable of igniting a plasma within a sealed discharge chamber filled with a gas (e.g., helium or oxygen) at gas pressures far below atmospheric pressure. This requirement dramatically increases the complexity and/or time required to manufacture medical device components at scale. Certain object geometries are also more challenging to etch with plasmas than others. For example, it is sometimes desirable to plasma-etch an interior surface of a tube having a small or narrow diameter, such as flexible polymer tubes and/or rigid or pliable catheters used to deliver drugs, gases, or other fluids in medical applications. Such tubes may have diameters of 1 mm or less. The geometry of such long, thin tubes make such interior surfaces difficult to access with an electric discharge plasma.

Therefore, a need exists for systems and methods that are capable of igniting an electric discharge plasma within an interior volume of narrow diameter tubes, preferably without requiring placement of such tubes in an evacuated discharge chamber, so as to plasma-etch the interior surface of lengths of such tubes in a scalable and cost-effective manner.

SUMMARY

According to an exemplary embodiment of the present disclosure, a system is provided for generating plasma within a polymer tube, the system comprising: the polymer tube having a longitudinal axis and an inner diameter of less than 1 millimeter; a nozzle connected to at least one end of the tube and configured to supply a gas into the interior of the tube at atmospheric pressure; at least one ring-shaped anode electrode positioned around an outer surface of the tube; at least one ring-shaped cathode electrode spaced apart from the at least one anode electrode along the longitudinal axis and positioned around the outer surface of the tube; and

2 a voltage source connected to the at least one anode electrode, wherein the system is configured to activate the voltage source to ignite a plasma within the gas in the interior of the tube.

According to another embodiment of the present disclosure, a method of plasma-etching an interior of a polymer tube is provided, the method comprising: filling the interior of the polymer tube with at least one gas at atmospheric pressure, wherein the tube has a longitudinal axis and an inner diameter of less than one millimeter; passing the tube through at least one ring-shaped anode electrode configured to surround an outer surface of the tube; passing the tube through at least one ring-shaped cathode electrode spaced apart from the anode electrode along the longitudinal axis and configured to surround the outer surface of the tube; activating a voltage source connected to the at least one ring-shaped anode electrode to ignite and maintain a plasma within the gas in the interior of the tube.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
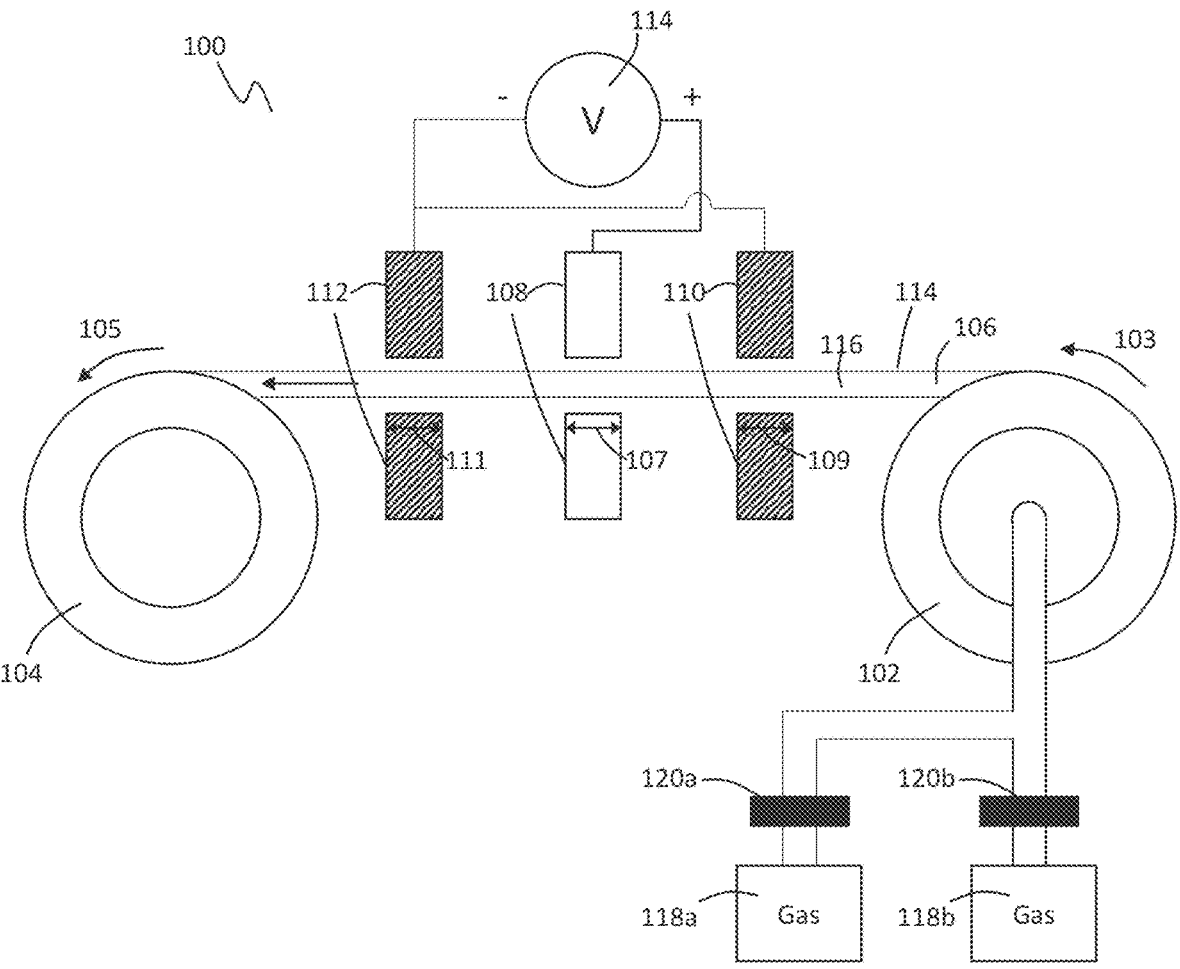
FIG. 1 depicts an exemplary system for plasma-etching an interior surface of a narrow diameter, flexible tube, according to some embodiments.

FIG. 1 depicts an exemplary system 100 for plasma-etching an interior surface of a narrow diameter, flexible tube. System 100 includes a flexible tube 106 which, in some embodiments, may have a diameter of 1 mm or less. In other embodiments and applications of system 100, other suitable tube diameters may be provided, such as 2 mm or less, 10 mm or less, or other suitable diameters. For example, flexible tube 106 may be a line set tube used in insulin infusion sets, which are typically made from low density polyethylene (LDPE) and have a diameter of approximately 0.038 cm. Tube 106 may be wound around a first spool 102 and a second spool 104. As spools 102 and 104 rotate in the direction of arrows 103 and 105 respectively, tube 106 is unwound from around first spool 102 and taken up by second spool 104.

Tube 106 is connected to one or more gas sources 118. In the embodiment depicted in system 100, tube 106 is connected to two gas sources 118a and 118b. The flow of gas from each source 118a and 118b is controlled by a flow restrictor 120a and 120b respectively (e.g., a valve or a pump). Each gas source may provide a different type of gas—for example, source 118a may supply oxygen while source 118b may supply helium. While system 100 depicts two gas sources, other embodiments are also possible which use only a single gas source, or which use more than two gas sources. The provision of separate gas sources with separate flow restrictors allows an operator to tailor the gas mix provided into tube 106. In certain embodiments, gas sources 118a and 118b introduce gas into the tube 106 at atmospheric pressure, e.g., approximately 760 torr (depending on elevation and weather conditions).

Figure 2:
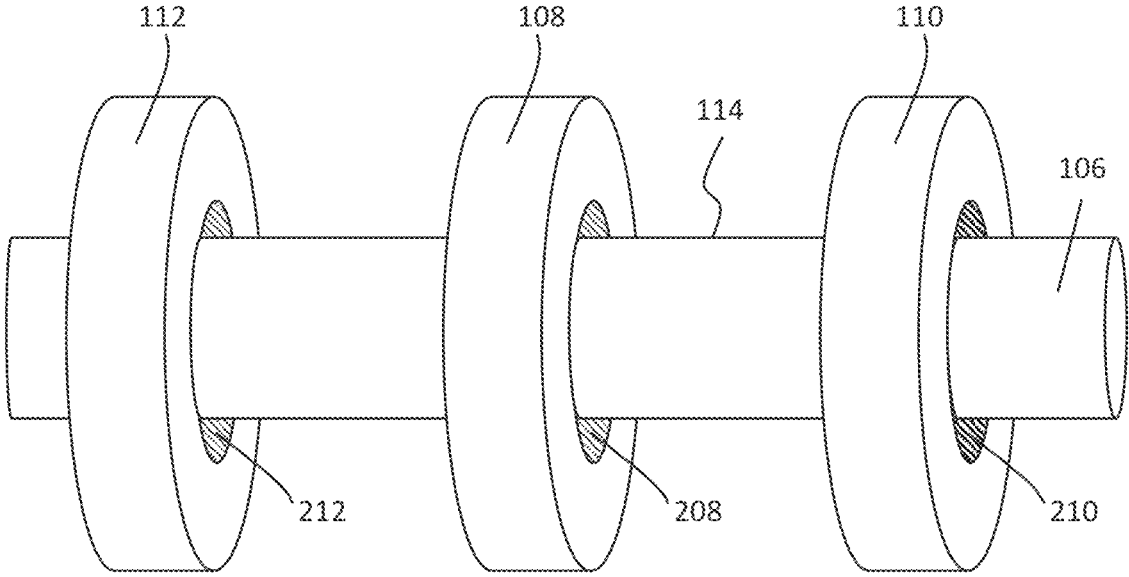
FIG. 2 depicts a close-up view of ring-shaped anode and cathode electrodes used in the exemplary system, according to some embodiments.

As tube 106 is unwound from first spool 102 and taken up by second spool 104, it passes through electrodes 108, 110, and 112. Electrode 108 is an anode and electrodes 110 and 112 are cathodes, and each of electrodes 108, 110 and 112 are connected to high-voltage power source 114. Alternatively, in some embodiments, only electrode 108 may be connected to power source 114, while cathode electrodes 110 and 112 may be connected to ground. As depicted in FIG. 2, each electrode 108, 110, and 112 is shaped like a ring and tube 106 passes through the lumen of each ring-shaped electrode. Electrodes 108, 110, and 112 are shaped and dimensioned such that their lumen are only slightly larger than an outer diameter of tube 106 so that the electrodes touch or closely surround outer surface 114 of tube 106. Electrodes 108, 110, and 112 are also positioned such that the cathode electrodes 110, 112 are spaced apart from the anode electrode 108 along a longitudinal axis of tube 106. When voltage source 114 is activated, electrodes 108, 110 and 112 generate a high-strength electric field within interior volume 116 of tube 106. This electric field ignites a plasma in the gas mixture within tube 106, which etches the interior surface of tube 106.

When the inner diameter of tube 106 is narrow, e.g., less than 1 mm, it may become more difficult to ignite the plasma within such a confined space. Furthermore, in some embodiments, no evacuation chamber is used to surround all or part of system 100, which means the gas mixture both within and outside tube 106 will be at approximately atmospheric pressure, which is generally around 760 torr (this may vary depending on the elevation and/or weather conditions). In other embodiments, the ends of tube 106 may be sealed and a pump may be used to decrease the gas pressure within tube 106. But even in such embodiments it would be preferable to not have to decrease the gas pressure surrounding tube 106 to lower manufacturing cost and complexity.

To decrease manufacturing cost and complexity, it may sometimes be preferable to maintain the gas pressure within tube 106 at or near atmospheric pressure. However, the presence of higher as pressure within tube 106 may also increase the difficulty of igniting and/or maintaining the plasma. To address these technical challenges, electrodes 108, 110, and 112 are configured such that no dielectric material or insulating barrier separates the interior surface of each electrode's lumen from the outer surface 114 of tube 106—rather, the interior surface 208, 210, 212 of each electrode's lumen surrounding the outer surface 114 of tube 106 (see FIG. 2) is bare metal. The material of the tube 106's wall itself acts as the dielectric barrier. This configuration allows electrodes 108, 110, and 112 to more closely surround the outer surface 114 of tube 106 and to increase the strength of the electric field generated within interior volume 116.

In addition, at least some of electrodes 108, 110, and 112 may be configured such that a cross-sectional thickness of each electrode at the point closest to the outer surface 114 of tube 106 is small. The cross-sectional thickness of electrodes 108, 110, and 112 at this closest point are denoted 107, 109, and 111 respectively in FIG. 1. In some embodiments, the cross-sectional thickness at this point for at least some electrodes may be less than 6 mm. In some embodiments, the cross-sectional thickness at this point may be less than 1 mm. In yet other embodiments, the cross-sectional thickness at this point may be less than 0.1 mm. The inventors have appreciated that a thin cross-sectional thickness of electrodes 108, 110, and 112 at the point closest to the outer surface 114 of tube 106 serves to increase the strength of the electric field generated within interior volume 116, thus making it easier to ignite the plasma within interior volume 116. For example, in some embodiments, cathodes 110, 112 may be shaped such that its cross-sectional thickness at the point closest to outer surface 114 is less than 6 mm, less than 1 mm, or less than 0.1 mm, while the cross-sectional thickness of anode 108 may be wider. In other embodiments, the cross-sectional thickness at the point closest to outer surface 114 may be less than 6 mm, less than 1 mm, or less than 0.1 mm, while the cross-sectional thickness of cathodes 110, 112 may be wider. In yet other embodiments, the cross-sectional thickness of each electrode 108, 110, and 112 at the point closest to outer surface 114 may be less than 6 mm, less than 1 mm, or less than 0.1 mm.

Although electrodes 108, 110, and 112 are depicted in FIGS. 1-2 as flat discs that have a uniform cross-sectional thickness, other embodiments may use electrodes that have a varying cross-sectional thickness. For example, the cross-sectional thickness of the electrodes may increase or flare out farther away from the outer surface 114 of tube 106. The electrodes may also taper to a smaller cross-sectional thickness farther away from the outer surface 114 of tube 106.

In embodiments where the gas pressure within tube 106 is maintained at or near atmospheric pressure, the gas mixture used within the tube may be different from the gas mixture surrounding the tube. For example, if the gas mixture outside and surrounding tube 106 is air (e.g., primarily nitrogen, oxygen, and carbon dioxide), then the gas mixture within tube 106 may be something else, such as pure helium, or primarily helium with a relatively small proportion (e.g., 5%) of oxygen. The differentiation between the gas mixture within tube 106 and outside tube 106 serves to ensure that the plasma ignited between the electrodes stays within the tube and does not ignite outside the tube.

In some embodiments however, it may be desired to use gas mixtures within tube 106 that are more similar to, or the same as, the gas mixture outside tube 106. For example, it may be desirable to use pure oxygen within tube 106, as plasmas ignited within oxygen may impart certain desirable functionalities and/or characteristics on the etched interior surfaces of tube 106. If the gas mixture outside tube 106 is air, then the gas mixture within tube 106 and outside tube 106 will be relatively similar, since air is approximately 20% oxygen. In such cases, the gas pressure within tube 106 may be significantly lowered, e.g., to 10 Torr or less, to 1 Torr or less, or to 0.1 Torr or less. Doing so ensures that the plasma ignited by the electrodes stay within tube 106 and little plasma is ignited outside of tube 106.

Figure 16:
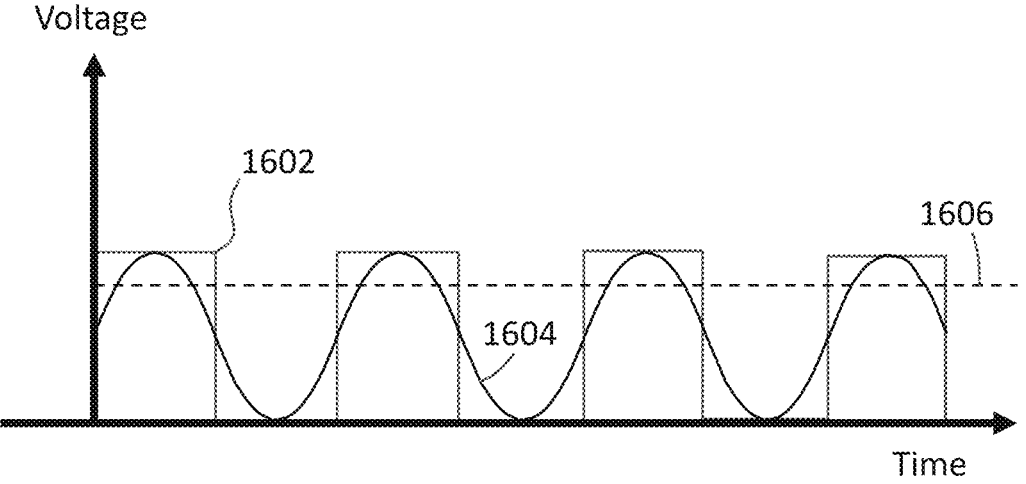
FIG. 16 shows an example of a square-wave voltage signal that may be used to drive the electrodes of the exemplary system.
Figure 17:
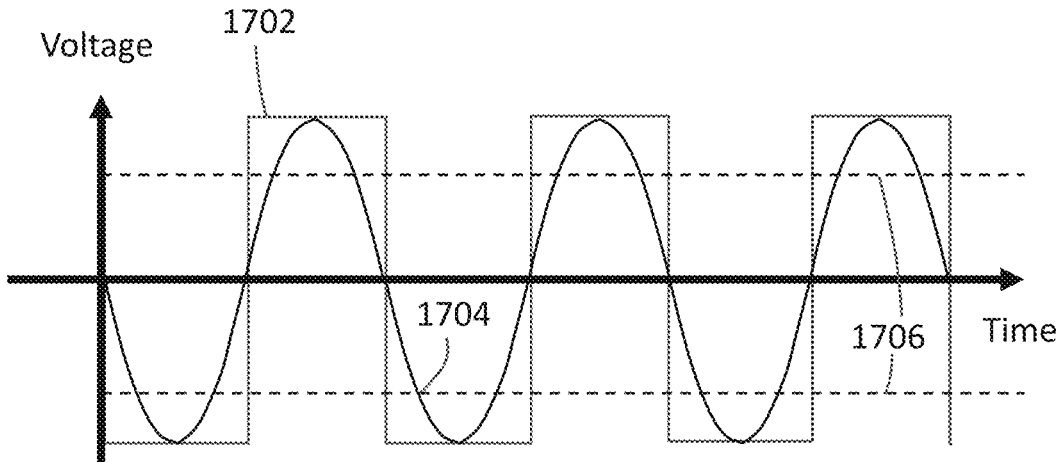
FIG. 17 shows another example of a square-wave voltage signal that may be used to drive the electrodes of the exemplary system.

In some embodiments, ignition and/or maintenance of a plasma within tube 106 may be further facilitated by driving electrodes 108, 110, and/or 112 with a square-wave voltage signal, such as signal 1602 (depicted in FIG. 16) or signal 1702 (depicted in FIG. 17). The inventors have appreciated that the plasma within tube 106 is only ignited and/or maintained when the amplitude of the voltage signal driving electrodes 108, 110, and/or 112 exceed a breakdown voltage threshold, depicted in FIGS. 16 and 17 as threshold 1606 and 1706, respectively. When this amplitude exceeds the breakdown voltage threshold, the plasma discharge pulse follows very shortly afterwards in time. A discharge pulse is typically a very short event, and may be much shorter than the period of the voltage signal driving electrodes 108, 110, and/or 112. By driving electrodes 108, 110, and/or 112 using a square wave signal (such as signal 1602 and/or 1702), system 100 helps ensure that the discharge pulse occurs at a higher voltage relative to a sinusoid signal having the same amplitude. For example, the plasma discharge pulse for a square wave may be expected to take place at a voltage that is at, or nearly at, the pulse amplitude, whereas the plasma discharge for a sinusoid wave may be expected to take place at a voltage that is at, or nearly at, the breakdown voltage (since the sinusoid wave varies less quickly compared to the square wave). As a result, the inventors have appreciated that a square wave signal may, in some embodiments, be able to ignite and/or maintain a stronger plasma than a sinusoid signal of equivalent amplitude and periodicity. Alternatively or in addition, the inventors have appreciated that a square wave signal may be able to ignite and/or maintain a plasma using a lower voltage amplitude compared to a sinusoid signal. In addition, the inventors have appreciated that a square-wave signal that reverses polarity, such as signal 1702 in FIG. 17, may help neutralize surface charge accumulation on the walls of tube 106.

Figure 3:
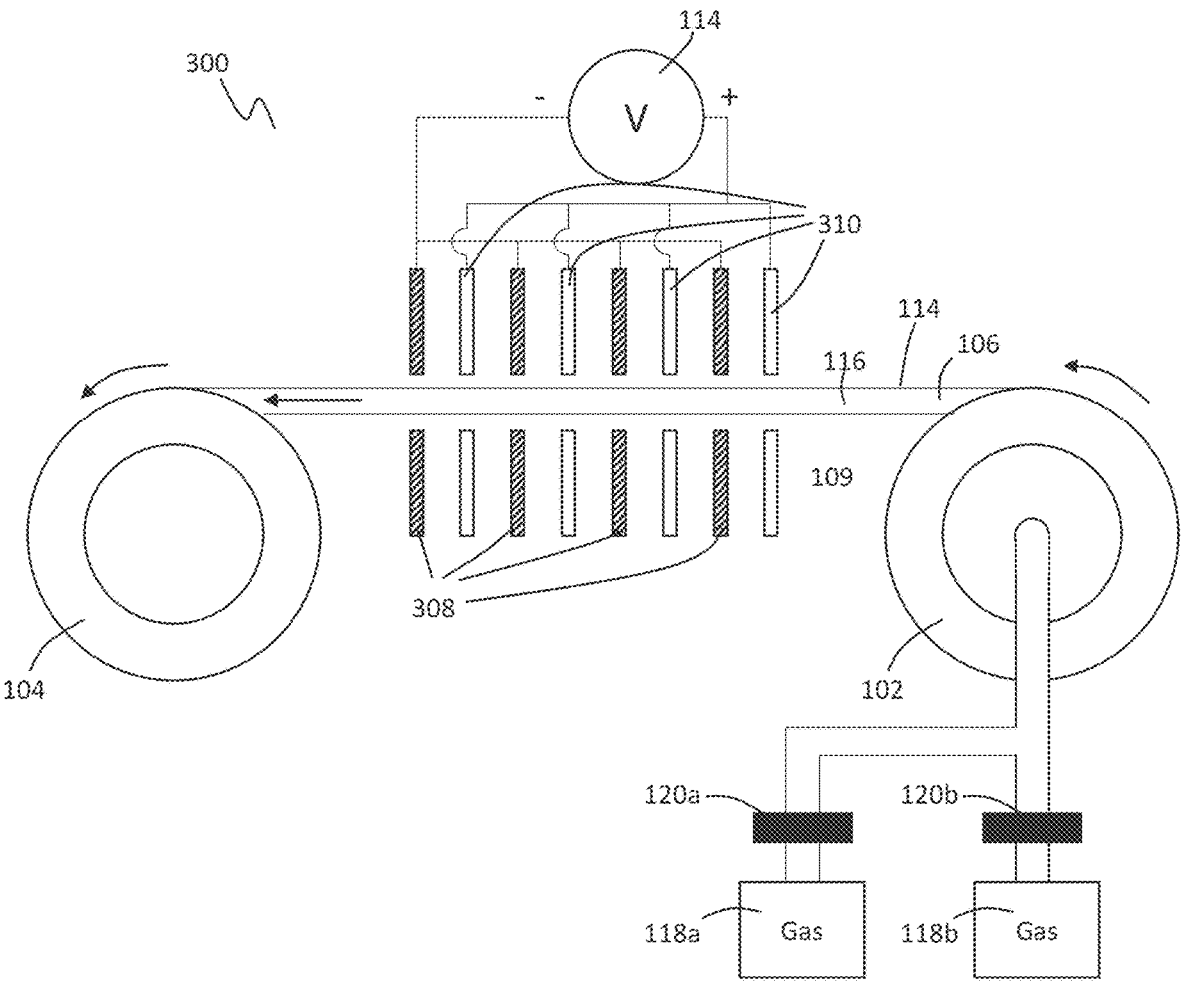
FIG. 3 depicts another exemplary system having a plurality of anode and cathode electrodes for plasma-etching the interior surface of the tube, according to some embodiments.

While FIGS. 1-2 depict three electrodes (one anode and two cathodes), other embodiments are also possible having fewer or more electrodes. In some embodiments, only two electrodes may be needed: one anode, and one cathode, spaced apart from one another along the longitudinal axis of tube 106. In other embodiments, a plurality of electrodes may be used. FIG. 3 depicts an alternate exemplary system 300 for plasma-etching a narrow diameter, flexible tube. System 300 is similar in many respects with system 100 and similarly configured components share the same numbering. However, instead of only one anode electrode 108 and two cathode electrodes 110, 112, system 300 incorporates a plurality of anode electrodes 310 (four in this embodiment, though other numbers are also possible) and a plurality of cathode electrodes 308 (four in this embodiment, though other numbers are also possible). The anodes 310 and the cathodes 308 are arranged in alternating manner such that a cathode is arranged between two adjacent anodes, and a cathode is arranged between two adjacent anodes. Similar to system 100, some or all of these electrodes may also have a cross-sectional thickness at the point closest to outer surface 114 of tube 106 that is less than 6 mm, less than 1 mm, or less than 0.1 mm, according to different embodiments. This alternating arrangement of multiple anode and cathode electrodes generates a stronger electric field that extends along a longer length of tube 106. This in turn generates a stronger and/or wider plasma that imparts a stronger plasma-etching effect on the interior surface of tube 106 as it is drawn through the electrodes by spools 104 and 106.

Furthermore, while FIGS. 1-3 depict systems for treating flexible tubes, such systems may also be adapted to treat rigid narrow diameter tubes, such as catheters. For example, such systems may be adapted by removing spools 104, 106. Instead, a rigid tube may be provided in place of flexible tube 106 and held in place by a clamping mechanism. In some embodiments, either the rigid tube, the anode and cathode electrode(s), or both may be mounted on linear actuators that move the generated plasma along different portions of the rigid tube to plasma treat a longer section of the tube.

Figure 4:
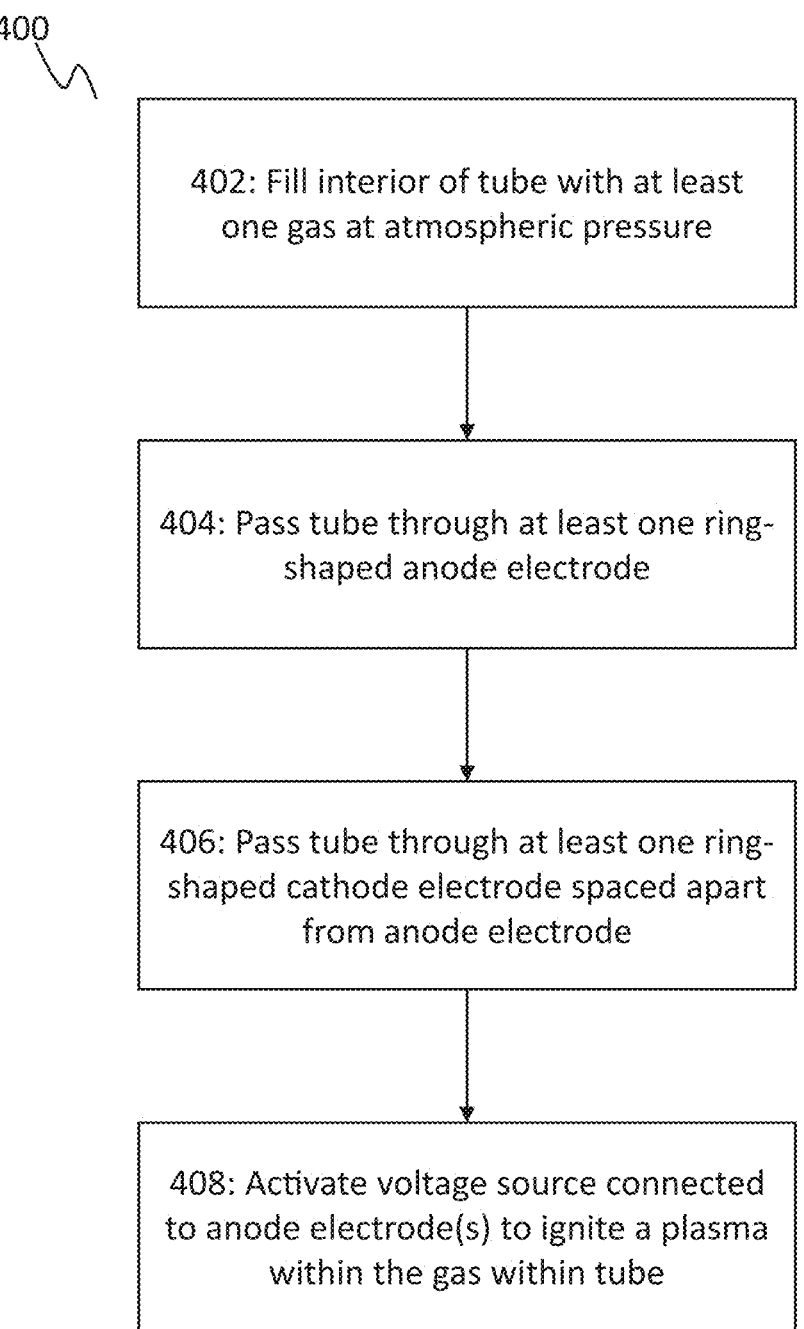
FIG. 4 depicts an exemplary process for plasma-etching the interior surface of the narrow diameter tube, according to some embodiments.

FIG. 4 depicts an exemplary process 400 for plasma-etching an interior of a rigid or flexible polymer tube. In some embodiments, the polymer tube may have an inner diameter of less than one millimeter. Also in some embodiments, the polymer tube may comprise low density polyethylene (LDPE). Process 400 begins at step 402, where the tube is filled with at least one gas at atmospheric pressure. For example, the gas may comprise oxygen, helium, and/or any other suitable gas for igniting a plasma therein. At step 404, the tube is passed through at least one ring-shaped anode electrode configured to surround an outer surface of the tube. At step 406, the tube is passed through at least one ring-shaped cathode electrode spaced apart from the anode electrode along a longitudinal axis of the polymer tube and also configured to surround the outer surface of the tube. As previously discussed, the anode and cathode electrodes may be sized and shaped to closely surround the tube such that an interior surface of each electrode's lumen touches or is positioned closely to the outer surface of the tube. In addition, the interior surface of each electrode's lumen may be bare metal, with no insulating material or dielectric barrier separating the metal electrode from the outer surface of the tube. At step 408, a voltage source that is connected to the anode electrode(s) (and optionally also connected to the cathode electrode(s)) is activated while the tube is positioned through all the electrode rings. The application of voltage to the electrode(s) generates an electric field within the interior volume of the tube, thus igniting and maintaining a plasma within the gas in the tube for as long as the voltage continues to be applied to the electrodes. This plasma may etch interior surfaces of the tube through chemical reactions between the material of the interior surfaces of the tube and reactive species generated by the plasma. This plasma etching imparts microscopic protrusions that alter various properties of the interior tube surface, such as the surface's hydrophilicity. By varying the voltage applied to the electrode(s), the distances between the anode and cathode electrode(s), the gas pressure and type of gas, and/or the treatment time, the size, shape, and/or density of protrusions imparted on the interior tube surface may be controllably altered.

EXAMPLES

Experimental examples are presented herein where: in a first experimental example, the fabrication of a working system for plasma-etching an interior surface of a narrow diameter, flexible tube was studied, in a second experimental example, the impact of varying electrode and plasma power on protrusion diameter and density was studied, in a third experimental example, the impact of varying plasma-etching treatment time on protrusion density was studied, in a fourth experimental example, the impact of varying a distance between a ground (cathode) electrode from the anode electrode on protrusion density was studied, and in a fifth experimental example, the impact of plasma treatment time on the hydrophilicity of the interior surface of the treated tube was studied. Each of the experimental examples are meant to provide further clarification of how systems 100 and/or 300 was either fabricated or tested during development. Any information provided herein is meant to support the prior disclosure and additionally provide non-limiting features and/or descriptions via the specific experimental discussions herein.

Example 1: Fabrication of Plasma-Etching System

Figure 5:
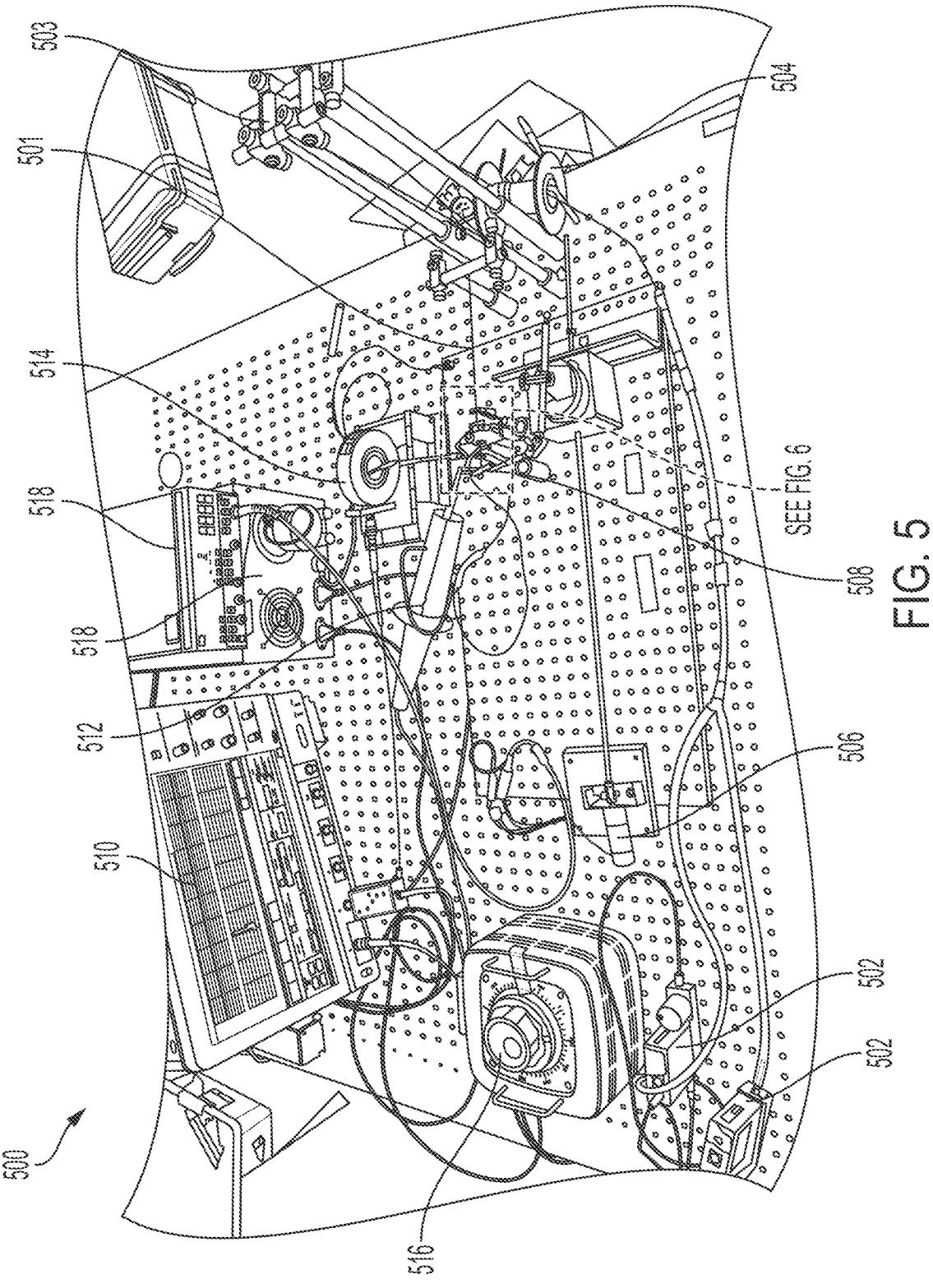
FIG. 5 is a photograph of an exemplary working system fabricated for plasma-etching an interior surface of a narrow diameter, flexible tube.
Figure 6:
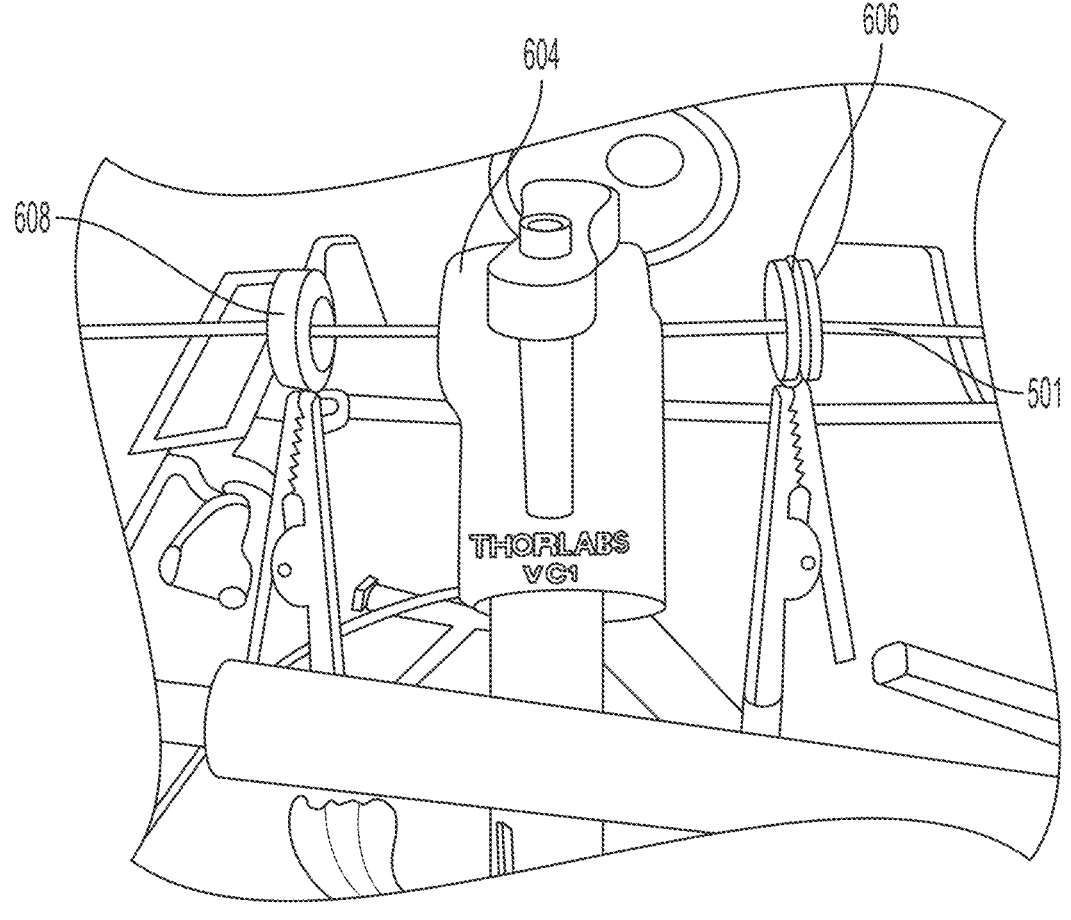
FIG. 6 depicts a close-up photograph of the working electrodes of the fabricated working system of FIG. 5.

In the first experimental example, the fabrication of a working system for plasma-etching an interior surface of a narrow diameter flexible tube was studied. FIG. 5 shows a photograph of the fully-assembled system 500, while FIG. 6 shows a close-up photograph of the working electrodes igniting a plasma within a flexible tube. The system comprised a flexible tube 501, which in this example was standard line-set tubing used in insulin infusion sets having an inner diameter of 0.038 cm and made of low density polyethylene (LDPE). Part of the length of tube 501 was wrapped about a spool 504. One end of tube 501 was connected to regulatable gas sources 502 which supplied helium and oxygen. The other end of tube 501 was guided through a rack and pulley system 503, passed through ring-shaped anode 604 and cathodes 606, 608 (see FIG. 6), and gripped by a pincer 508. Pincer 508 was in turn mounted to a motorized linear actuator 506 mounted on a working surface. When activated, linear actuator 506 moved pincer 508 in linear fashion from right to left (as depicted in FIG. 5), thus drawing tube 501 out of spool 504 and through the ring-shaped anode 604 and cathodes 606, 608.

Ring-shaped cathodes 606, 608 were constructed from copper and had a cross-sectional thickness of approximately 0.1 mm at the point closest to the outer surface of tube 501. Ring-shaped anode 604 was constructed from copper and had a cross-sectional thickness of 22 mm.

Also depicted in FIG. 5 is a pulse generator and high-voltage (HV) power supply 518. Power supply 518 was connected to anode 604, while cathodes 606, 608 were connected to ground. The amount of power provided by power supply 518 was controlled by power control knob 516, which allowed the inventors to investigate the effects of different plasma powers on protrusion size and density. In addition, the current supplied by power supply 518 was measured by current probe 514, while the voltage supplied by power supply 518 was measured by voltage probe 512. Current probe 514 and voltage probe 512 were connected to an oscilloscope 510, which allowed the inventors to visualize the frequency, amplitude, and phase of both signals.

Figure 7A:
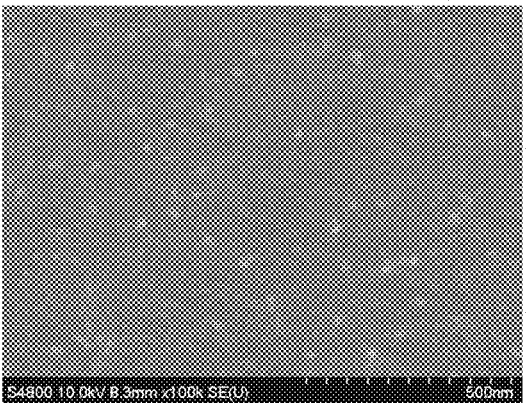
FIGS. 7A, 7B show exemplary scanning electron microscope (SEM) images of protrusions induced after about 30 min dielectric barrier discharge (DBD) plasma treatment at about 10 mW.
Figure 7B:
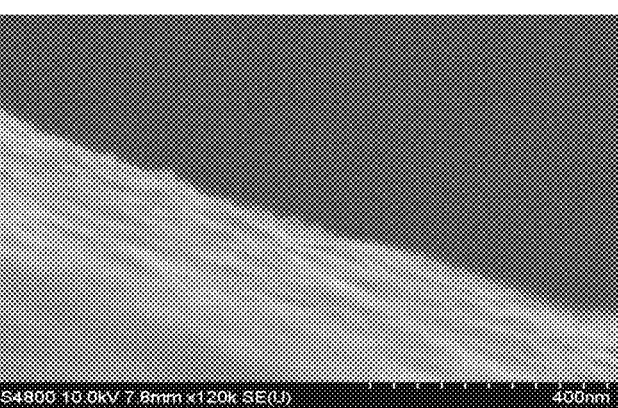
Figure 8A:
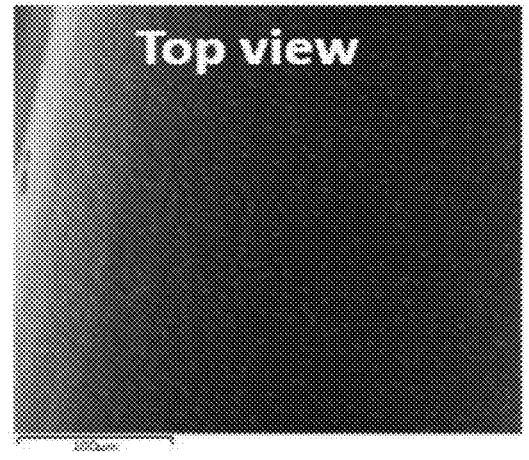
FIGS. 8A, 8B show exemplary SEM images of protrusions induced after about 30 min DBD plasma treatment at about 50 mW.
Figure 8B:
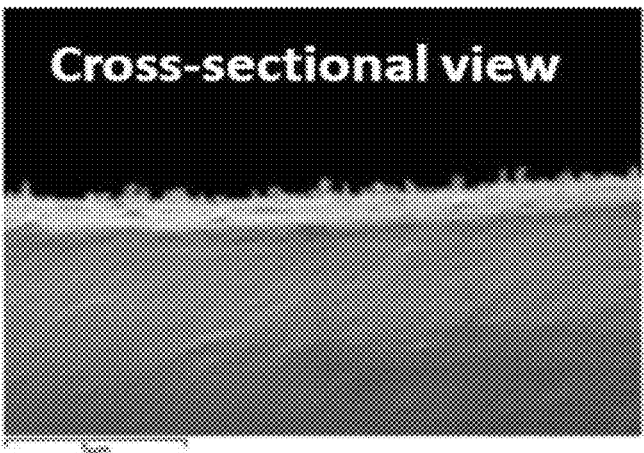
Figure 9A:
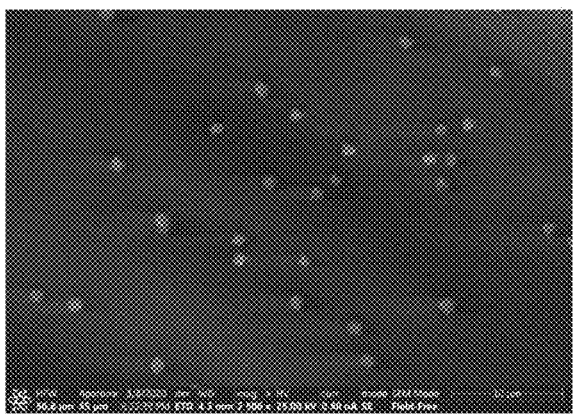
FIGS. 9A, 9B show exemplary SEM images of protrusions induced after about 10 min DBD plasma treatment at about 135 mW.
Figure 9A:
Figure 9B:
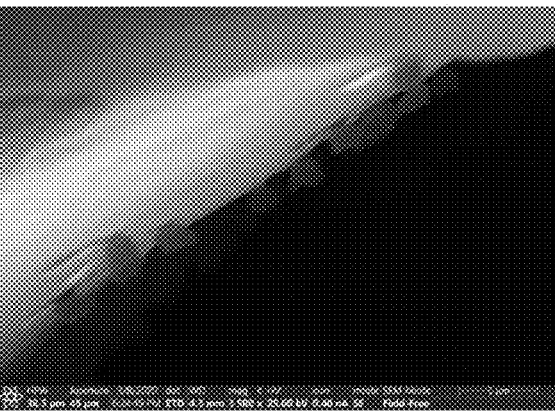

Plasma-etching the interior surface of tube 501 yielded observable protrusions that were visible using a scanning electron microscope (SEM). FIGS. 7A and 7B show SEM images of protrusions induced after approximately 30 minutes of dielectric barrier discharge (DBD) plasma treatment at about 10 mW—the average protrusion diameter was approximately 10-20 nm. FIGS. 8A and 8B show SEM images of protrusions induced after approximately 30 minutes DBD plasma treatment at about 50 mW—the average protrusion diameter was approximately in the 100s of nm. FIGS. 9A and 9B show SEM images of protrusions induced after approximately 10 minutes of DBD plasma treatment at about 135 mW—the average protrusion diameter was approximately 1-3 µm·r As can be seen, the plasma-etching process yielded protrusions having diameters that ranged from a few nanometers to a few microns, and having a density that varied from 0 to 106 per square mm.

Example 2: Impact of Plasma Power on Protrusion Size and Density

Figure 15:
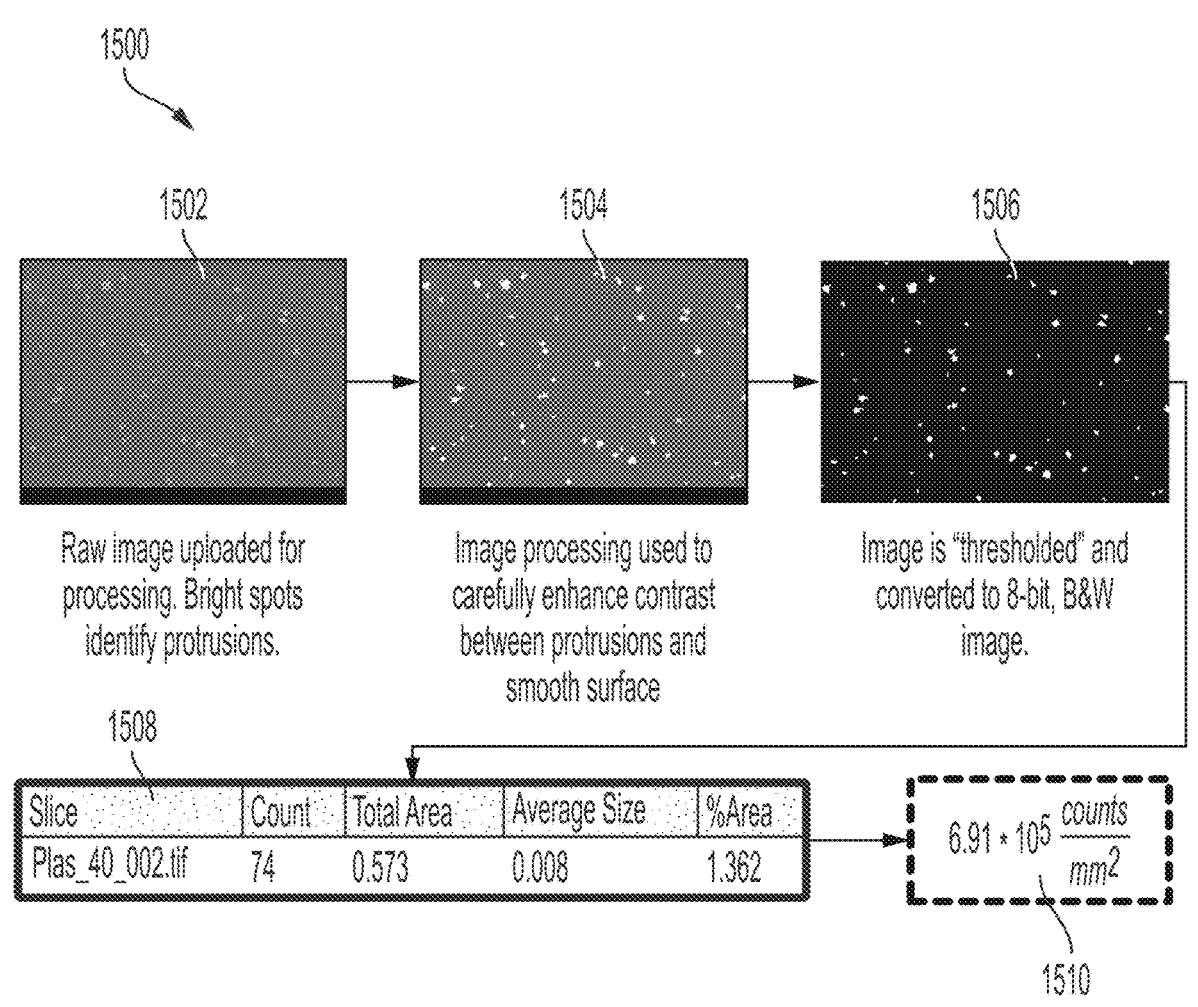
FIG. 15 depicts an exemplary procedure used to determine number density and size distribution of plasma-induced protrusions.

In the second experimental example, the impact of varying electrode and plasma power on the diameter and density of protrusions imparted to the interior surface of the tube was studied. Different tube samples were plasma-etched for 30 minutes at different power levels ranging from 15 to 190 mW. The discharge power was determined using discharge current measurements by a 2100 Pearson current monitor and discharge voltage measurements by a P6015 Tektronix high voltage probe. The power was calculated and monitored simultaneously with the discharge operation on-board a Lecroy oscilloscope. The plasma-etched tube samples were then analyzed to measure average protrusion diameter and density. The following procedure 1500 outlined in FIG. 15 was used to determine number density and size distribution of the plasma-induced protrusions. Multiple images of the plasma-etched interior surface of a tube sample were acquired using a Scanning Electron Microscope (SEM) and then processed in ImageJ software. Specifically, raw SEM images (1502) were processed to enhance contrast between protrusions and the smooth surface (1504), and finally were converted to an 8-bit black-and-white image (1506). The black-and-white images were then processed using software to determine a total count, a total area in view (calculated based on scale of image), and an average size of each protrusion (determined by approximating each protrusion with a circular one) (see 1508). From the count and total area in view, a count per square millimeter can be calculated (see 1510). The protrusion size distribution function F(D) was determined as follows:

$$F(D) = \frac{\Delta N}{\Delta D \Delta A}$$

(number of protrusions per unit area AA with diameters in the range between D and D+ΔD). The protrusion number density per unit area $$\left(\frac{\Delta N}{\Delta A}\right)$$

was determined then as a $0^{th}$ moment of the distribution function:

$$\frac{\Delta N}{\Delta A} = \int F(D)dD.$$

An average protrusion diameter ( ) was determined as a $1^{st}$ moment of the distribution $$\langle D \rangle = \frac{\int F(D)DdD}{\int F(D)dD}.$$

The protrusion size variation was characterized by the standard deviation $\sigma_D$ of the distribution function F(D).

Figure 10:
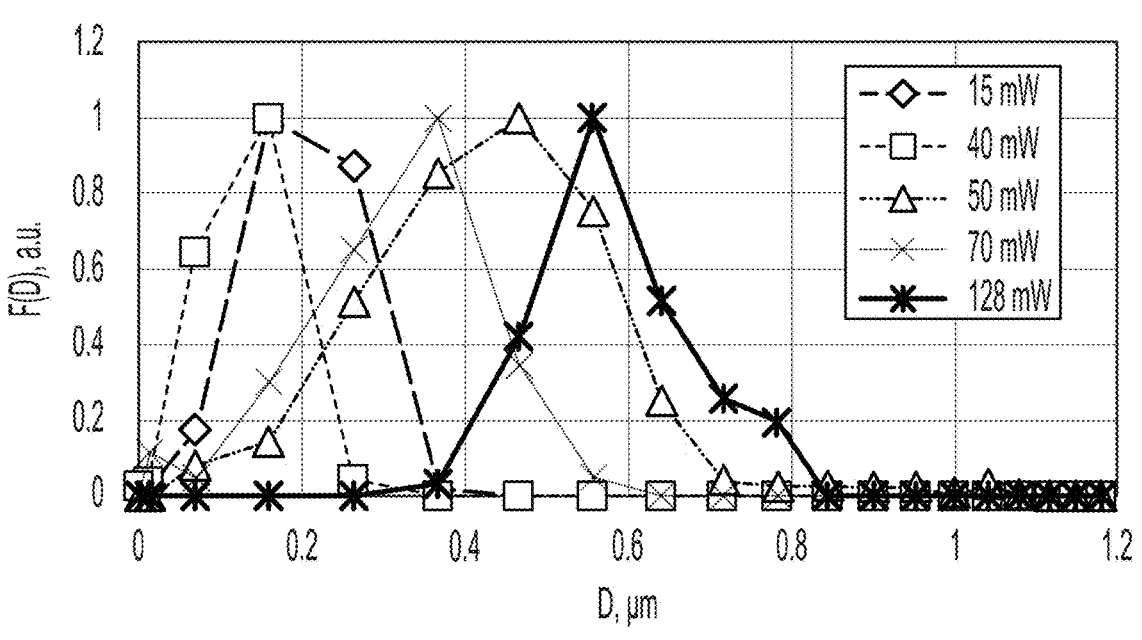
FIG. 10 presents an exemplary graphical representation showing the size of protrusions resulting from plasma-etching treatment versus the plasma power.
Figure 11:
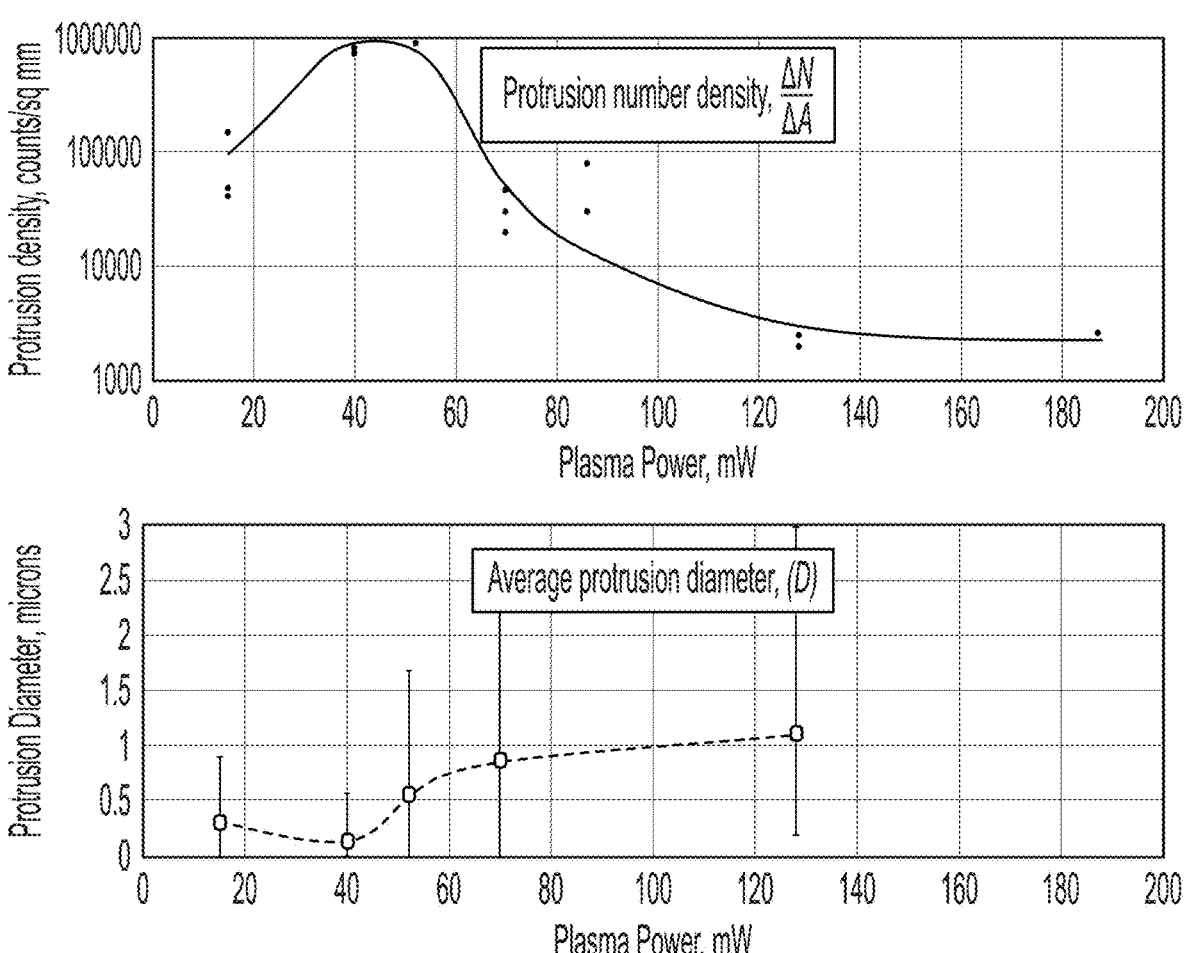
FIG. 11 presents example observations that show how protrusion density and average protrusion diameter varies with plasma power.

FIG. 10 presents multiple plots of protrusion size distribution functions F (D) taken at different plasma powers, i.e., at 15 mW, 40 mW, 50 mW, 70 mW, and 128 mW. Each plot shows normalized frequency of occurrence (in arbitrary units) of protrusions having different size diameters (as measured in microns). The top plot in FIG. 11 presents average observed protrusion number density $$\left(\frac{\Delta N}{\Delta A}\right)$$

in units of counts per square millimeter plotted against plasma power in mW, while the bottom plot in FIG. 11 presents average observed protrusion diameter in units of microns plotted against plasma power in mW. As can be seen, both the size and density of protrusions may be controllably altered by varying the plasma power. In particular, we observed that: (i) Number density of the protrusions varied three (3) orders of magnitude in the tested power range yielding maximal $$\frac{\Delta N}{\Delta A} = 10^6$$

counts/mm² for about 40 mW and minimal $$\frac{\Delta N}{\Delta A} = 10^3$$

counts/mm² for P≈130 mW (the top plot in FIG. 11); (ii) average protrusion diameter ⟨ D⟩ varied from 0.1 μm at P≈40 mW to about 1 μm for P≈130 mW (the bottom plot in FIG. 11); (iii) protrusion size spread OD varied from 0.1 μm at P≈40 mW to about 0.5 μm for P≈130 mW (the bottom plot in FIG. 11); (iv) ΔN/ΔA and⟨ D⟩ were inversely correlated with larger number density of protrusions corresponding to the smaller average protrusion diameter; (v)⟨ D⟩ and $\sigma_D$ were directly correlated with larger protrusions corresponding to the larger diameter spread.

Example 3: Impact of Treatment Time on Protrusion Density

Figure 12:
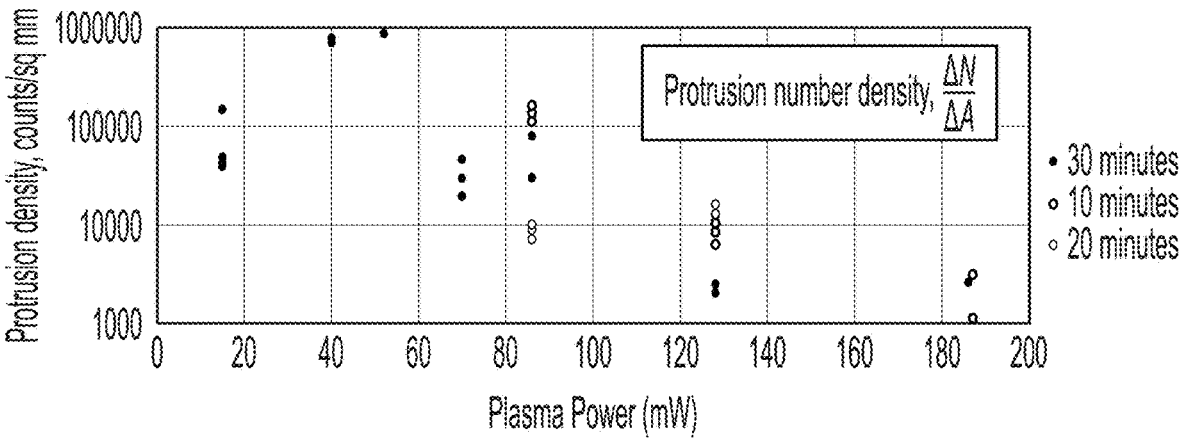
FIG. 12 presents example results that show how protrusion density changes with plasma power and treatment time.

In the third experimental example, the impact of varying plasma-etching treatment time on protrusion number density was studied. Samples of tubing were subjected to the plasma-etching treatment using the above-described working system for various combinations of plasma power and treatment times. FIG. 12 presents protrusion density in units of counts per square millimeter plotted against plasma power in mW, and also shows measurements taken after 10 minutes, 20 minutes, and 30 minutes of treatment. One can see that treatment time shorter that 30 mins can be sufficient for inducing the protrusions.

Example 4: Impact of Distance to Electrode on Protrusion Density

Figure 13:
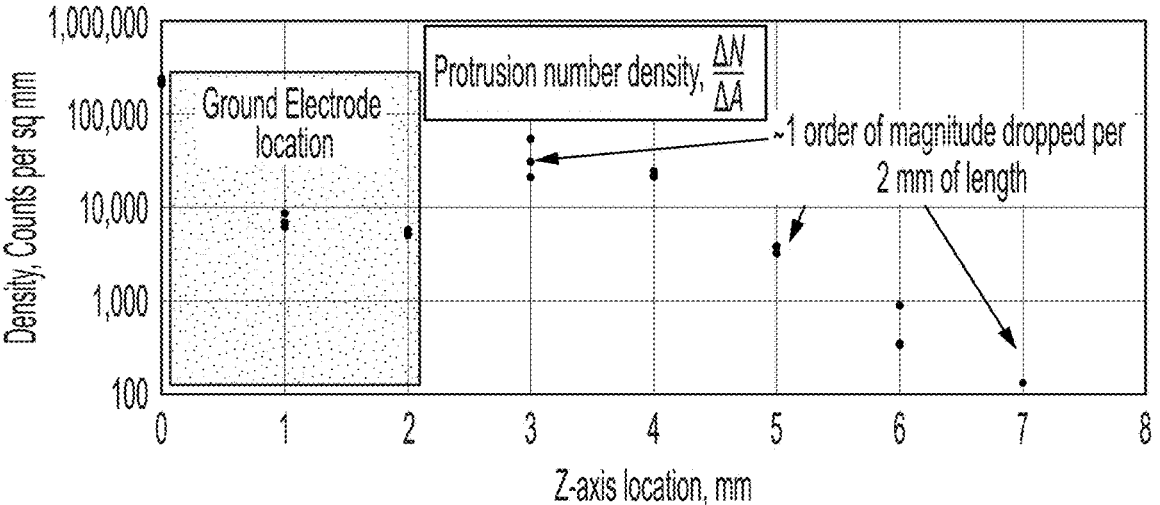
FIG. 13 presents example results that show how protrusion density changes with distance between the anode electrode(s) and the cathode electrode(s).

In the fourth experimental example, the impact of varying the distance between the ground (cathode) electrode and observation point on protrusion density was studied. Samples of tubing were subjected to plasma treatment for 30 minutes using the above-described working system at 75 mW plasma power. FIG. 13 plots the density of observed protrusions, in units of counts per square millimeter, against different distances from the observation point to the ground (cathode) electrode (in millimeters). As can be seen, the observed number density of protrusions decreased dramatically when move away from the cathode edge (highest near the ground electrode (2-5)·10⁴ counts/mm² and decreased to (3-7)·10² counts/mm² at 6 mm from the ground electrode edge). Average diameter of the protrusions varied inversely with the frequency from 0.3 μm (electrode edge) to 0.7 μm (at 6 mm from the electrode).

Example 5: Impact of Treatment Time on Interior Surface Hydrophilicity

Figure 14:
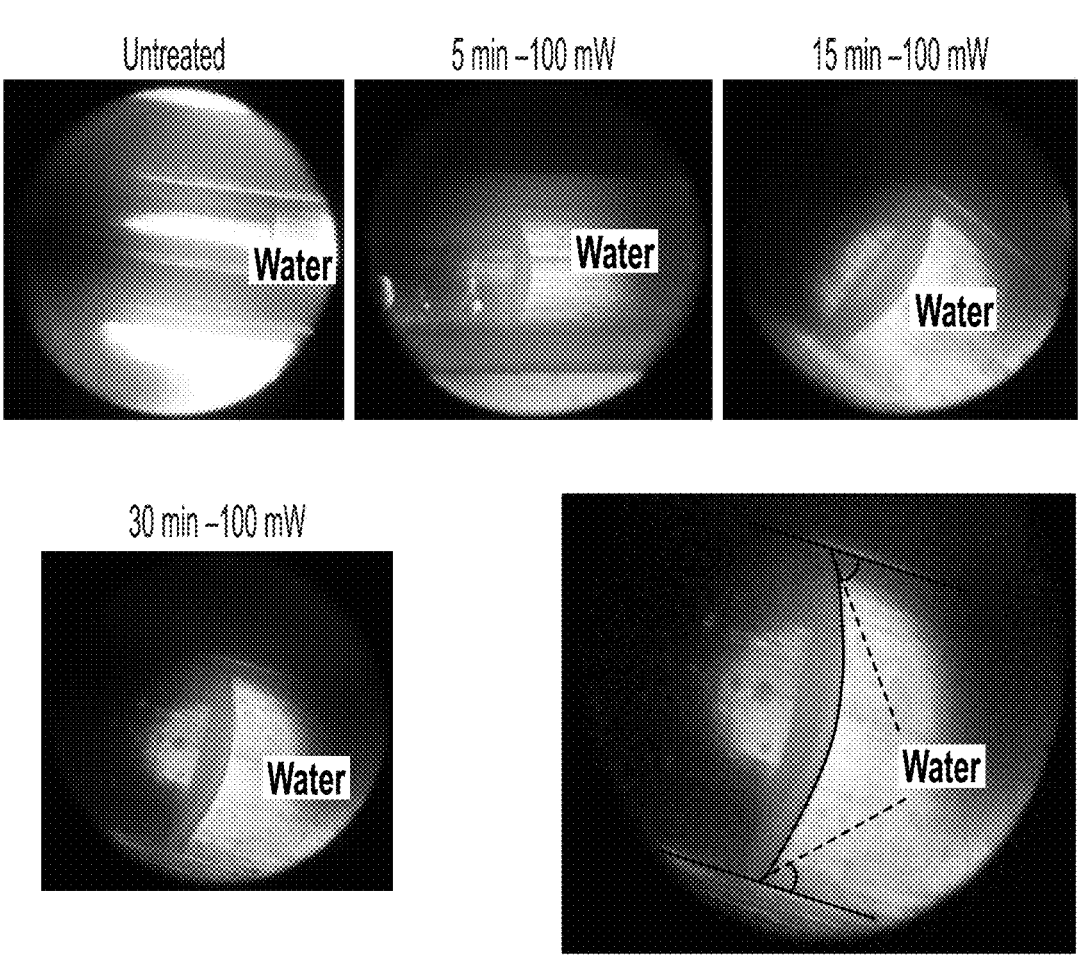
FIG. 14 compares photographs of water within untreated tubes with photographs of water within plasma-etched tubes to illustrate the impact of plasma-etching treatment on the hydrophilicity of the interior surface of such tubes.
Figure 14:
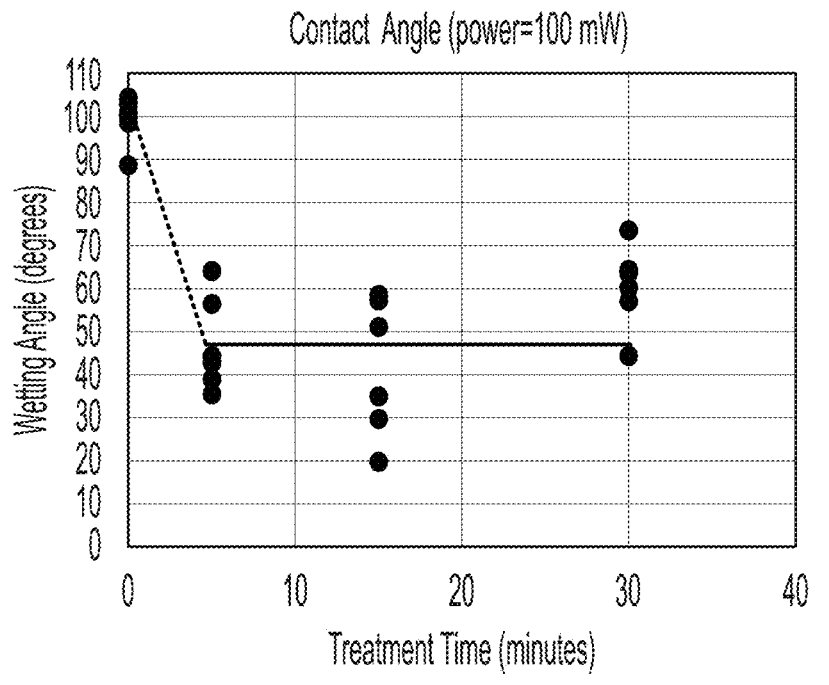

In the fifth experimental example, the impact of varying treatment time on the hydrophilicity of the interior surface of treated tubes was studied. To evaluate the hydrophilicity of the interior surface of a small diameter tube, a small amount of water was deposited within the tube and the contact angle (illustrated in FIG. 14) between the air/water boundary and the inner walls of the tube was measured. The contact angle was measured for (i) tubes that had not been plasma treated, (ii) tubes treated for 5 minutes at 100 mW plasma power, (iii) tubes treated for 15 minutes at 100 mW plasma power, and (iv) tubes treated for 30 minutes at 100 mW plasma power. The bottom right plot of FIG. 14 presents the measured contact angles (in degrees) plotted against treatment time. As can be seen, even treating the tubes for 5 minutes dramatically improved the hydrophilicity of the interior surface of the tube. Specifically, the contact angle for the non-treated tube was 90-100° while decreased to 40-50° for the treated tube (near ground electrode location).

The terms "first", "second", "third" and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the embodiments of the disclosure described herein are capable of operation in other sequences and/or arrangements than are described or illustrated herein.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

Multiple aspects are disclosed, which include, but are not limited to, the following aspects:

1. A system for generating plasma within a polymer tube, the system comprising: the polymer tube having a longitudinal axis and an inner diameter of less than 1 millimeter; a nozzle connected to at least one end of the tube and configured to supply a gas into the interior of the tube at atmospheric pressure; at least one ring-shaped anode electrode positioned around an outer surface of the tube; at least one ring-shaped cathode electrode spaced apart from the at least one anode electrode along the longitudinal axis and positioned around the outer surface of the tube; and a voltage source connected to the at least one anode electrode, wherein the system is configured to activate the voltage source to ignite a plasma within the gas in the interior of the tube.

2. The system of aspect 1, wherein the nozzle is configured to supply the gas into the interior of the tube at atmospheric pressure.

3. The system of any of aspects 1-2, wherein the plasma, when ignited, forms protrusions on an interior surface of the tube to increase a hydrophilicity of the interior surface.

4. The system of any of aspects 1-3, wherein a cross-sectional thickness of the at least one anode electrode closest to the outer surface of the tube is less than 6 mm.

5. The system of aspect 4, wherein the cross-sectional thickness of the at least one anode electrode closest to the outer surface of the tube is less than 1 mm.

6. The system of aspect 5, wherein the cross-sectional thickness of the at least one anode electrode closest to the outer surface of the tube is less than 0.1 mm.

7. The system of any of aspects 1-6, wherein a cross-sectional thickness of the at least one cathode electrode closest to the outer surface of the tube is less than 6 mm.

8. The system of aspect 7, wherein the cross-sectional thickness of the at least one cathode electrode closest to the outer surface of the tube is less than 1 mm.

9. The system of aspect 8, wherein the cross-sectional thickness of the at least one cathode closest to the outer surface of the tube is less than 0.1 mm.

10. The system of any of aspects 1-9, wherein: the at least one ring-shaped cathode electrode and the at least one ring-shaped anode electrode consists essentially of metal; a space between the outer surface of the tube and the at least one ring-shaped cathode electrode is devoid of a dielectric barrier; and a space between the outer surface of the tube and the at least one ring-shaped anode electrode is devoid of a dielectric barrier.

11. The system of any of aspects 1-10, wherein the tube acts as a dielectric barrier between the at least one ring-shaped cathode electrode and the gas in the interior of the tube, and as a dielectric barrier between the at least one ring-shaped anode electrode and the gas in the interior of the tube.

12. The system of any of aspects 1-10, wherein the gas is at least one of helium and oxygen.

13. The system of any of aspects 1-12 wherein the tube is flexible, the system further comprising a spool configured to draw the flexible tube through the at least one cathode electrode and the at least one anode electrode while the voltage source is activated to form protrusions on the interior surface along a length of the flexible tube.

14. The system of any of aspects 1-13, wherein the at least one cathode electrode comprises a plurality of cathode electrodes and the at least one anode electrodes comprises a plurality of anode electrodes, the plurality of anode electrodes and the plurality of cathode electrodes being spaced apart from one another in an alternating arrangement.

15. The system of any of aspects 1-14, wherein the tube comprises low density polyethylene (LDPE).

16. The system of any of aspects 1-15, wherein the gas is a first gas and the nozzle is a first nozzle, the system further comprising a second nozzle connected to at least one end of the tube and configured to supply a second gas into the interior of the tube, wherein the first nozzle and the second nozzle are individually adjustable to allow an operator to adjust a mixture of the first gas and the second gas supplied into the interior of the tube.

17. A method of plasma-etching an interior of a polymer tube, the method comprising: filling the interior of the polymer tube with at least one gas, wherein the tube has a longitudinal axis and an inner diameter of less than one millimeter; passing the tube through at least one ring-shaped anode electrode configured to surround an outer surface of the tube; passing the tube through at least one ring-shaped cathode electrode spaced apart from the anode electrode along the longitudinal axis and configured to surround the outer surface of the tube; activating a voltage source connected to the at least one ring-shaped anode electrode to ignite and maintain a plasma within the gas in the interior of the tube.

18. The method of aspect 17, wherein the interior of the polymer tube is filled with the at least one gas at atmospheric pressure.

19. The method of any of aspects 17-18, wherein the plasma, when ignited, forms protrusions on an interior surface of the tube to increase a hydrophilicity of the interior surface.

20. The method of any of aspects 17-19, wherein a cross-sectional thickness of the at least one anode electrode closest to the outer surface of the tube is less than 6 mm.

21. The method of aspect 20, wherein the cross-sectional thickness of the at least one anode electrode closest to the outer surface of the tube is less than 1 mm.

22. The method of aspect 21, wherein the cross-sectional thickness of the at least one anode electrode closest to the outer surface of the tube is less than 0.1 mm.

23. The method of any of aspects 17-22, wherein a cross-sectional thickness of the at least one cathode electrode closest to the outer surface of the tube is less than 6 mm.

24. The method of aspect 23, wherein the cross-sectional thickness of the at least one cathode electrode closest to the outer surface of the tube is less than 1 mm.

25. The method of aspect 24, wherein the cross-sectional thickness of the at least one cathode closest to the outer surface of the tube is less than 0.1 mm.

26. The method of any of aspects 17-25, wherein: the at least one ring-shaped cathode electrode and the at least one ring-shaped anode electrode consists essentially of metal; a space between the outer surface of the tube and the at least one ring-shaped cathode electrode is devoid of a dielectric barrier; and a space between the outer surface of the tube and the at least one ring-shaped anode electrode is devoid of a dielectric barrier.

27. The method of any of aspects 17-26, wherein the tube acts as a dielectric barrier between the at least one ring-shaped cathode electrode and the gas in the interior of the tube, and as a dielectric barrier between the at least one ring-shaped anode electrode and the gas in the interior of the tube.

28. The method of any of aspects 17-27, wherein the gas is at least one of helium and oxygen.

29. The method of any of aspects 19-28, wherein the tube is flexible, the method further comprising drawing the tube through the at least one cathode electrode and the at least one anode electrode while the voltage source is activated so as to form protrusions along a length of the flexible tube.

30. The method of any of aspects 17-29, wherein the at least one cathode electrode comprises a plurality of cathode electrodes and the at least one anode electrodes comprises a plurality of anode electrodes, the plurality of anode electrodes and the plurality of cathode electrodes being spaced apart from one another in alternating arrangement.

31. The method of any of aspects 17-30, wherein the tube comprises low density polyethylene (LDPE).

What is claimed is:

1. A system for generating plasma within a polymer tube, the system comprising:

the polymer tube having a longitudinal axis and an inner diameter of less than 1 millimeter;

a nozzle connected to at least one end of the tube and configured to supply a gas into an interior of the tube;

at least one ring-shaped anode electrode positioned around an outer surface of the tube;

at least one ring-shaped cathode electrode spaced apart from the at least one anode electrode along the longitudinal axis and positioned around the outer surface of the tube; and a voltage source connected to the at least one anode electrode, wherein the system is configured to activate the voltage source to ignite a plasma within the gas in the interior of the tube.

2. The system of claim 1, wherein the nozzle is configured to supply the gas into the interior of the tube at atmospheric pressure.

3. The system of claim 1, wherein the plasma, when ignited, forms protrusions on an interior surface of the tube to increase a hydrophilicity of the interior surface.

4. The system of claim 1, wherein a cross-sectional thickness of the at least one anode electrode closest to the outer surface of the tube is less than 6 mm.

5. The system of claim 4, wherein the cross-sectional thickness of the at least one anode electrode closest to the outer surface of the tube is less than 1 mm.

6. The system of claim 5, wherein the cross-sectional thickness of the at least one anode electrode closest to the outer surface of the tube is less than 0.1 mm.

7. The system of claim 1, wherein a cross-sectional thickness of the at least one cathode electrode closest to the outer surface of the tube is less than 6 mm.

8. The system of claim 7, wherein the cross-sectional thickness of the at least one cathode electrode closest to the outer surface of the tube is less than 1 mm.

9. The system of claim 8, wherein the cross-sectional thickness of the at least one cathode closest to the outer surface of the tube is less than 0.1 mm.

10. The system of claim 1, wherein:

the at least one ring-shaped cathode electrode and the at least one ring-shaped anode electrode consists essentially of metal;

a space between the outer surface of the tube and the at least one ring-shaped cathode electrode is devoid of a dielectric barrier; and a space between the outer surface of the tube and the at least one ring-shaped anode electrode is devoid of a dielectric barrier.

11. The system of claim 1, wherein the tube acts as a dielectric barrier between the at least one ring-shaped cathode electrode and the gas in the interior of the tube, and as a dielectric barrier between the at least one ring-shaped anode electrode and the gas in the interior of the tube.

12. The system of claim 1, wherein the gas is at least one of helium and oxygen.

13. The system of claim 1 wherein the tube is flexible, the system further comprising a spool configured to draw the flexible tube through the at least one cathode electrode and the at least one anode electrode while the voltage source is activated to form protrusions on an interior surface of the tube along a length of the flexible tube.

14. The system of claim 1, wherein the at least one cathode electrode comprises a plurality of cathode electrodes and the at least one anode electrodes comprises a plurality of anode electrodes, the plurality of anode electrodes and the plurality of cathode electrodes being spaced apart from one another in an alternating arrangement.

15. The system of claim 1, wherein the tube comprises low density polyethylene (LDPE).

16. The system of claim 1, wherein the gas is a first gas and the nozzle is a first nozzle, the system further comprising a second nozzle connected to at least one end of the tube and configured to supply a second gas into the interior of the tube, wherein the first nozzle and the second nozzle are individually adjustable to allow an operator to adjust a mixture of the first gas and the second gas supplied into the interior of the tube.

17. The system of claim 1, wherein the voltage source is configured to provide a square-wave signal to the at least one anode electrode when the voltage source is activated.

* * * * *